(12) United States Patent
Takahashi

(10) Patent No.: US 8,519,690 B2
(45) Date of Patent: *Aug. 27, 2013

(54) POWER SUPPLY CONTROL DEVICE AND POWER SUPPLY CONTROL METHOD

(75) Inventor: Hideyuki Takahashi, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/608,025

(22) Filed: Sep. 10, 2012

(65) Prior Publication Data

US 2012/0326685 A1 Dec. 27, 2012

Related U.S. Application Data

(63) Continuation of application No. 12/662,484, filed on Apr. 20, 2010, now Pat. No. 8,264,212.

(30) Foreign Application Priority Data

Apr. 21, 2009 (JP) .................................. 2009-103080

(51) Int. Cl.
*G05F 1/575* (2006.01)
*H02M 3/335* (2006.01)

(52) U.S. Cl.
USPC ...................... 323/283; 363/21.05; 363/21.13

(58) Field of Classification Search
USPC .......... 363/21.01, 21.04, 21.05, 21.12, 21.13, 363/95, 97; 323/283
See application file for complete search history.

(56) References Cited

U.S. PATENT DOCUMENTS

| | | | |
|---|---|---|---|
| 7,057,907 B2 | 6/2006 | Oh | |
| 7,471,531 B2 | 12/2008 | Blaha et al. | |
| 7,511,973 B2 | 3/2009 | Kesterson et al. | |
| 7,570,037 B2 | 8/2009 | Li et al. | |
| 7,640,455 B2 | 12/2009 | Leung et al. | |
| 7,759,921 B2 * | 7/2010 | Prodic | 323/283 |
| 7,990,122 B2 * | 8/2011 | Sase et al. | 323/283 |
| 8,264,212 B2 * | 9/2012 | Takahashi | 323/283 |
| 8,305,064 B2 * | 11/2012 | Bianco et al. | 323/283 |

FOREIGN PATENT DOCUMENTS

| | | |
|---|---|---|
| JP | 2005-185045 A | 7/2005 |
| JP | 2007-288892 A | 11/2007 |

OTHER PUBLICATIONS

Japanese Office Action dated Jul. 2, 2013 with a partial English translation.

* cited by examiner

*Primary Examiner* — Gary L Laxton
(74) *Attorney, Agent, or Firm* — McGinn IP Law Group, PLLC

(57) ABSTRACT

A control device includes a first terminal receiving a monitored output voltage and a second terminal transmitting a pulse width modulation (PWM) signal. A converting unit generates an A/D conversion synchronous signal, and an A/D converter samples the monitored output voltage in accordance with the A/D conversion synchronous signal. A pulse oscillator controls a position of a first edge on the PWM signal in accordance with the A/D conversion synchronous signal, and controls a position of a second edge based on the monitored voltage.

5 Claims, 7 Drawing Sheets

POWER SUPPLY CONTROL DEVICE AND POWER SUPPLY CONTROL METHOD

CROSS-REFERENCE TO RELATED APPLICATION

This application is a Continuation application of U.S. patent application Ser. No. 12/662,484, filed on Apr. 20, 2010, now U.S. Pat. No. 8,264,212.

This application is based upon and claims the benefit of the priority of Japanese patent application No. 2009-103080, filed on Apr. 21, 2009, the disclosure of which is incorporated herein in its entirety by reference thereto.

TECHNICAL FIELD

The present invention relates to a power supply control device and a power supply control method, and in particular to switching power supply control technology in a digital control system.

BACKGROUND

Along with the spread of mobile devices such as cell phones in recent years, in order to extend usage time of the mobile devices, the need for reducing power consumption for implemented application processors is increasing. In order to realize this reduction in power consumption, there is a need for a power supply control circuit that can be activated at high speed and in which high accuracy suppression of output voltage variation is possible. With regard to a high accuracy power supply control circuit, in a case where it is attempted to realize high accuracy control that suppresses the output voltage variation by PID control or load variation, since computational expressions related to control are complicated and the number of computations increases, implementation by a conventional analog circuit is difficult, and implementation is done by a digital circuit.

For example, Patent Document 1 discloses a digital control system power supply device having a transformer, a switching means for switching application of electrical power to a primary (coil) winding of the transformer in accordance with the duty of a received pulse width modulation (PWM) signal, a detection means for detecting an output value for a load connected to a secondary (coil) winding side of the transformer, a sampling means for sampling the output value detected by the detection means, an averaging means for averaging the sampled output value and outputting an average output value, and a duty determination means for determining duty corresponding to a target value based on the average output value outputted from the averaging means. According to this type of digital control system power supply device, it is possible to supply a stabilized output to a load.

[Patent Document 1] JP Patent Kokai Publication No. JP-P2005-185045A

SUMMARY

The entire disclosure of Patent Document 1 is incorporated herein by reference thereto. The following analysis is given by the present disclosure.

A digital control system power supply device described in Patent Document 1 determines duty corresponding to a target value based on an average output value, and generates a PWM signal according to a determined ON duty ratio. As a result, a delay occurs until the PWM signal is generated. Therefore, a time difference occurs from starting a control computation until control based on an actual control computation result is reflected in an output voltage and this leads to deterioration in control accuracy of output voltage variation. Thus there is much desired in the art.

According to a first aspect of the present disclosure, a power supply control device is provided with a direct current converter unit that steps up or steps down an input voltage to be outputted, and a control unit that controls output voltage of the direct current converter unit by a pulse width modulation signal. The direct current converter unit is provided with a voltage detection circuit that monitors the output voltage. The control unit is provided with an A/D converter that samples a monitored voltage value of the voltage detection circuit, and a pulse oscillator that controls the position of one edge by an A/D conversion synchronous signal indicating the start of sampling by the A/D converter, and generates the pulse width modulation signal which controls the position of the other edge based on the monitored voltage value.

According to a second aspect of the present disclosure, there is provided a power supply control method, wherein output voltage is controlled by a pulse width modulation signal in a case where input voltage is stepped up or stepped down and outputted. The method includes monitoring the output voltage; sampling a monitored value of the output voltage in order to perform A/D conversion; controlling the position of one edge of the pulse width modulation signal by an A/D conversion synchronous signal indicating the start of the sampling; and controlling the position of the other edge of the pulse width modulation signal based on the monitored value.

The meritorious effects of the present disclosure are summarized as follows. According to the present disclosure, control accuracy with regard to variation of output voltage is further improved.

BRIEF DESCRIPTIONS OF THE DRAWINGS

PREFERRED MODES

Figure 1:
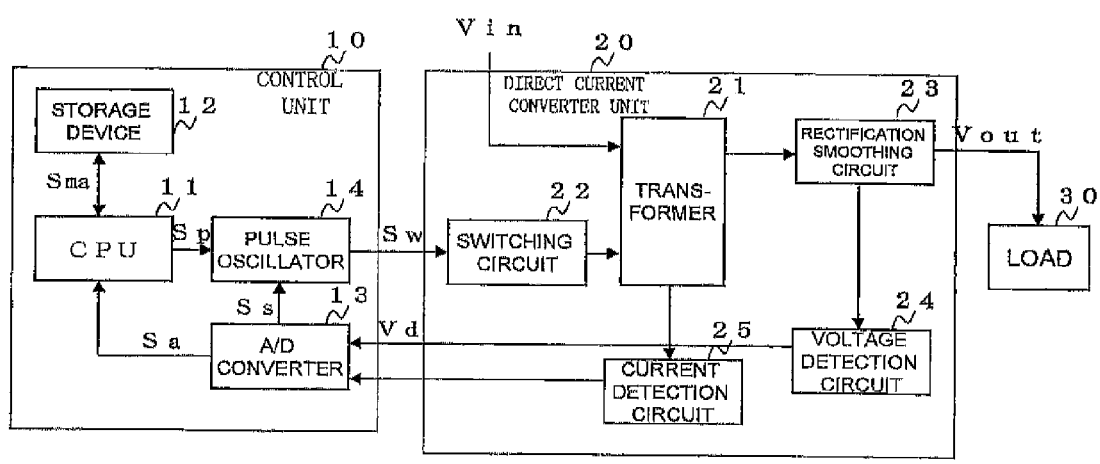
FIG. 1 is a drawing showing a configuration of a power supply control device according to a first exemplary embodiment of the present disclosure.

A power supply control device according to an exemplary mode of the present disclosure is provided with a direct current converter unit (20 in FIG. 1) that steps up or steps down an input voltage (Vin in FIG. 1) to be outputted, and a control unit (10 in FIG. 1) that controls output voltage (Vout in FIG. 1) of the direct current converter unit by a pulse width modulation signal (Sw in FIG. 1). The direct current converter unit is provided with a voltage detection circuit (24 in FIG. 1) that monitors output voltage. The control unit is provided with an A/D converter (13 in FIG. 13) that samples a monitored voltage value (Vd in FIG. 1) of the voltage detection circuit, and a pulse oscillator (14 in FIG. 1) that controls the position of one edge by an A/D conversion synchronous signal (Ss in FIG. 1) indicating the start of sampling by the A/D converter, and generates the pulse width modulation signal (Sw in FIG. 1) that controls the position of the other edge based on the monitored voltage value.

In the power supply control device, the pulse oscillator may be provided with a control computing unit that computes the duty ratio of a pulse width modulation signal based on the monitored voltage value, and an output circuit that controls the position of one edge by the A/D conversion synchronous signal becoming active, and outputs the pulse width modulation signal, which controls the position of the other edge based on the duty ratio computed by the control computing unit.

In the power supply control device, a plurality of direct current converter units may be provided, and the control unit may make positions of the A/D conversion synchronous signal indicating the start of sampling by the A/D converter, different, corresponding to the respective direct current converter units; the A/D converter may sample monitored voltage values of voltage detection circuits in the respective direct current converter units; and the pulse oscillator may control the position of one and the other edge of respective pulse width modulation signals for the respective direct current converter units and may generate the respective pulse width modulation signals.

The power supply control device may be provided with 2 direct current converters, and the control unit may make one edge in the A/D conversion synchronous signal indicating the start of sampling by the A/D converter, to correspond to one of the direct current converter units, may make the other edge correspond to the other direct current converter unit, and may start respective sampling by the A/D converter.

According to the above type of power supply control device, there is generated a pulse width modulation signal that controls the position of one edge by the A/D conversion synchronous signal indicating the start of sampling by the A/D converter, and that controls the position of the other edge based on the monitored voltage value. Therefore, the monitored voltage value is reflected at high speed in the duty with regard to the pulse width modulation signal. As a result, control accuracy with regard to variation of output voltage is further improved.

A detailed description is given below according to exemplary embodiments, making reference to the drawings.

First Exemplary Embodiment

FIG. 1 is a block diagram showing a configuration of a power supply control device according to a first exemplary embodiment of the present disclosure. In FIG. 1, the power supply control device is provided with a control unit 10 and a direct current converter unit 20. The direct current converter unit 20 is controlled by the control unit 10, and a voltage Vout obtained by stepping up or stepping down a power supply voltage Vin from outside is supplied to a load 30.

The direct current converter unit 20 is provided with a transformer 21, a switching circuit 22, a rectification smoothing circuit 23, a voltage detection circuit 24, and a current detection circuit 25. In the transformer 21, by turning the switching circuit 220N and OFF by a pulse width modulation (PWM) signal, a primary side winding operates intermittently, and an alternating voltage obtained by stepping up or stepping down the power supply voltage Vin is supplied from a secondary side winding to the rectification smoothing circuit 23. The rectification smoothing circuit 23 rectifies and smoothes the stepped-up or stepped-down alternating voltage and supplies the voltage as an output voltage Vout to the load 30. The voltage detection circuit 24 detects a monitored voltage equivalent to the output voltage Vout, and outputs the monitored voltage to the control unit 10 as a monitored voltage value Vd. The current detection circuit 25 detects a value of a secondary current in the transformer 21 and outputs to the control unit 10.

The control unit 10 is provided with a CPU 11, a storage device 12, an A/D converter 13, and a pulse oscillator 14. The A/D converter 13, with the monitored voltage value Vd from the voltage detection circuit 24 as input, performs sampling and A/D conversion, and outputs to the CPU 11 as an AD converter output signal Sa. Furthermore, the A/D converter 13 outputs an AD conversion synchronous signal Ss to the pulse oscillator 14 at the same time as the sampling. Here, with regard to the control unit 10, a description is given as follows concerning a case where, with the direct current converter unit 20 performing constant voltage control, the monitored voltage value Vd from the voltage detection circuit 24 is inputted. With regard to the control unit 10, in a case of the direct current converter unit 20 performing constant voltage control, a monitored current value from the current detection circuit 25 is inputted and operation is performed.

The CPU 11 receives as input the AD converter output signal Sa to be stored in the storage device 12 as sampling data Sma, and additionally computes the duty of a pulse width modulation signal by a known algorithm, and outputs a computed result to the pulse oscillator 14 as a CPU output signal Sp. The pulse oscillator 14 controls the position of one edge by the AD conversion synchronous signal Ss, generates a pulse width modulation signal Sw that controls the position of the other edge by the CPU output signal Sp based on the monitored voltage value Vd, and outputs the generated signal to the switching circuit 22.

Figure 2:
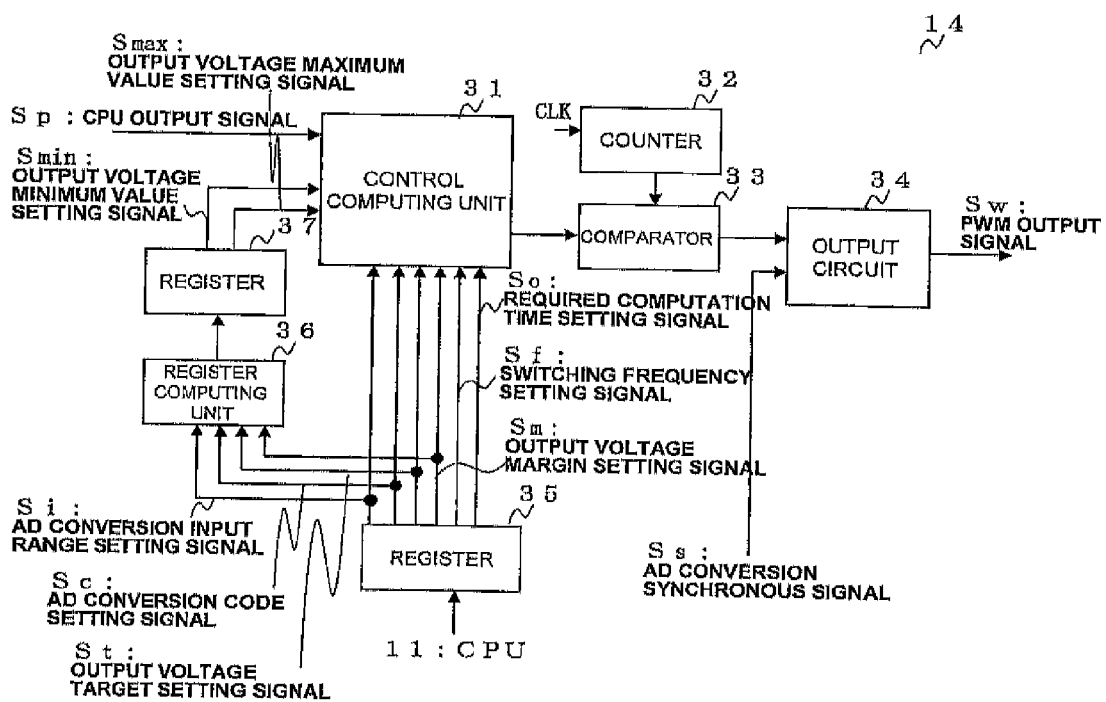
FIG. 2 is a drawing showing a configuration of a pulse oscillator according to the first exemplary embodiment of the present disclosure.

Next, a description is given concerning details of the pulse oscillator 14. FIG. 2 is a drawing showing a configuration of the pulse oscillator according to the first exemplary embodiment of the present disclosure. The pulse oscillator 14 is provided with a control computing unit 31, a counter 32, comparator 33, an output circuit 34, registers 35 and 37, and a register computing unit 36.

The control computing unit 31 receives, as input, a CPU output signal Sp, an AD conversion input range setting signal Si that sets an input voltage range of the A/D converter 13, an AD conversion code setting signal Sc that sets an output code of the A/D converter 13, a switching frequency setting signal Sf that sets a period of a pulse width modulation signal Sw, a required computation time setting signal So that sets time required for computation by the control computing unit 31, an output voltage target setting signal St that sets a target value of the output voltage Vout, an output voltage margin setting signal Sm that sets a variation range for the target value of the output voltage Vout, an output voltage maximum value setting signal Smax, and an output voltage minimum value setting signal Smin, and outputs a control computation result determining an edge position of the pulse width modulation signal Sw to the comparator 33.

The comparator 33 compares output of the counter 32 that counts a clock signal CLK, and the control computation result outputted by the control computing unit 31, and outputs a comparison result to the output circuit 34. That is, the comparator 33 outputs a time position to the output circuit 34, based on the control computation result. The counter 32 is cleared when the AD conversion synchronous signal Ss rises and the like.

In a case where the AD conversion synchronous signal Ss has a high level, the output circuit 34 outputs the PWM output signal Sw at a high level, and in a case where the comparison result of the comparator 33 indicates a match, the output circuit 34 outputs the PWM output signal Sw at a low level.

The register 35 holds the AD conversion input range setting signal Si, the AD conversion code setting signal Sc, the switching frequency setting signal Sf, the required computation time setting signal So, the output voltage target setting signal St, and the output voltage margin setting signal Sm, as given by the CPU 11.

The register computing unit 36 receives as input the switching frequency setting signal Sf, the required computation time setting signal So, the output voltage target setting signal St, and the output voltage margin setting signal Sm, and outputs a register computation result to the register 37.

The register 37 outputs, from the register computation result of the register computing unit 36, the output voltage maximum value setting signal Smax and the output voltage minimum value setting signal Smin to the control computing unit 31.

Figure 3:
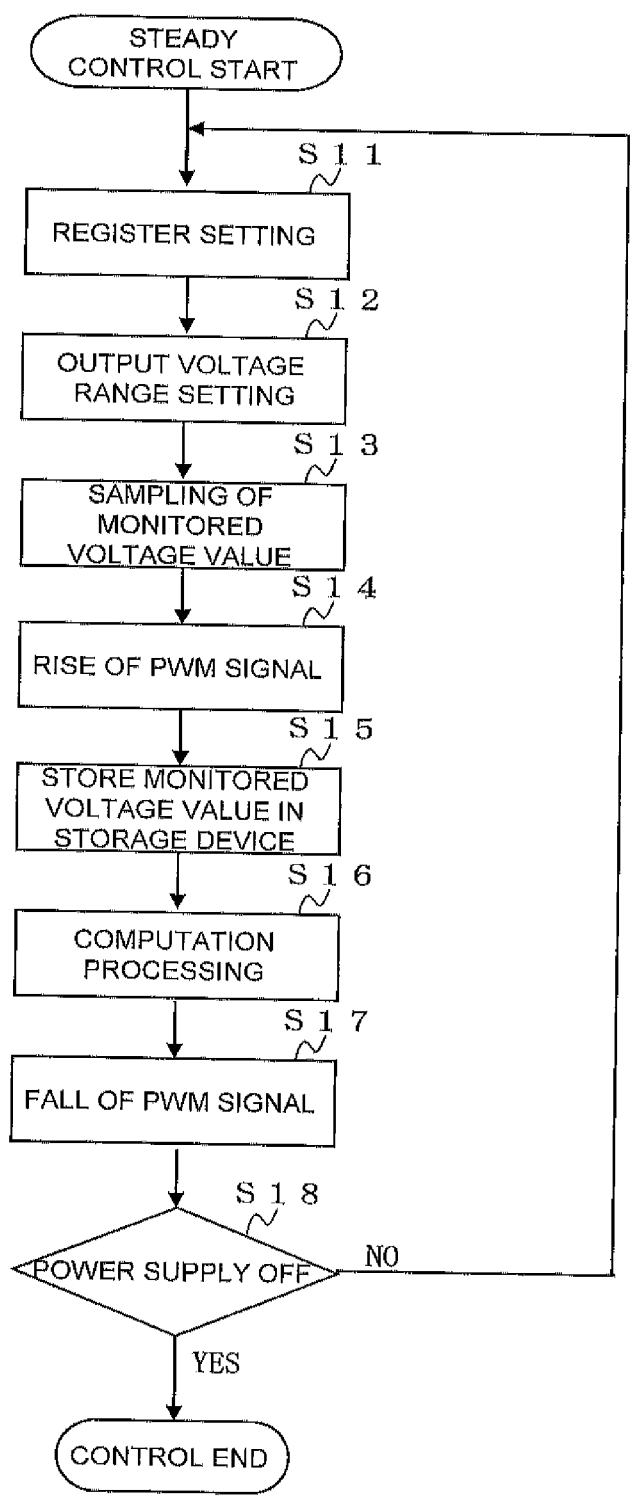
FIG. 3 is a flowchart for describing operation of the power supply control device according to the first exemplary embodiment of the present disclosure.

FIG. 3 is a flowchart describing operation of the power supply control device according to the first exemplary embodiment of the present disclosure, and operations in FIG. 1 and FIG. 2 are described using the flowchart of FIG. 3.

The CPU 11 sets the output voltage target setting signal St, the output voltage margin setting signal Sm, the AD conversion input range setting signal Si, the AD conversion code setting signal Sc, the switching frequency setting signal Sf, and the required computation time setting signal So, in the register 35 (step S11).

The register computing unit 36 computes an output range of the output voltage Vout from the AD conversion input range setting signal Si, the AD conversion code setting signal Sc, and the output voltage target setting signal St, as set in step S11, and sets a computation result in the register 37 (step S12).

The A/D converter 13 samples the monitored voltage value Vd, and in addition outputs the AD conversion synchronous signal Ss at a high level to the pulse oscillator 14 (step S13).

In step S13, by the AD conversion synchronous signal Ss having a high level output, the output circuit 34 outputs the PWM output signal Sw at a high level, and the switching circuit 22 outputs at a low level to the transformer 21 (step S14).

The A/D converter 13 performs A/D conversion of the monitored voltage value Vd that was sampled, and outputs the AD conversion synchronous signal Ss to the pulse oscillator 14 at a low level. Furthermore, the CPU 11 receives the AD converter output signal Sa, and stores the sampling data Sma in the storage unit 12 (step S15).

The CPU 11 performs a computation in order to determine the duty of the AD converter output signal Sa, and outputs the CPU output signal Sp that determines an ON duty ratio of the PWM output signal Sw to the control computing unit 31 (step S16).

The pulse oscillator 14 generates the PWM output signal Sw, in accordance with the ON duty ratio of the PWM output signal Sw determined in step S16. That is, the comparator 33 compares output of the control computing unit 31 and output of the counter 32, and if in agreement, the switching circuit 22 outputs at a high level, by the output circuit 34 outputting the PWM output signal Sw at a low level (step S17).

The CPU 11 confirms whether or not the power supply is OFF, and in a case of being OFF, ends control processing; in a case of not being OFF, returning to step S11, the control processing is repeated (step S18).

The control unit 10, by repeating the above steps S11 to S18, controls increase and decrease of the ON duty ratio of the PWM output signal Sw so that the monitored voltage value Vd matches the output voltage target setting signal St.

In the direct current converter unit 20, the switching circuit 22 is repeatedly turned ON and OFF by the PWM output signal Sw controlled by the control unit 10; an input voltage applied to a primary winding of the transformer 21 is switched according to the ON duty ratio; and an alternating voltage stepped up or stepped down on a secondary winding side is induced. In this way, the output voltage Vout outputted from the rectification smoothing circuit 23 is controlled so as to approach the output voltage target setting signal St.

Figure 4:
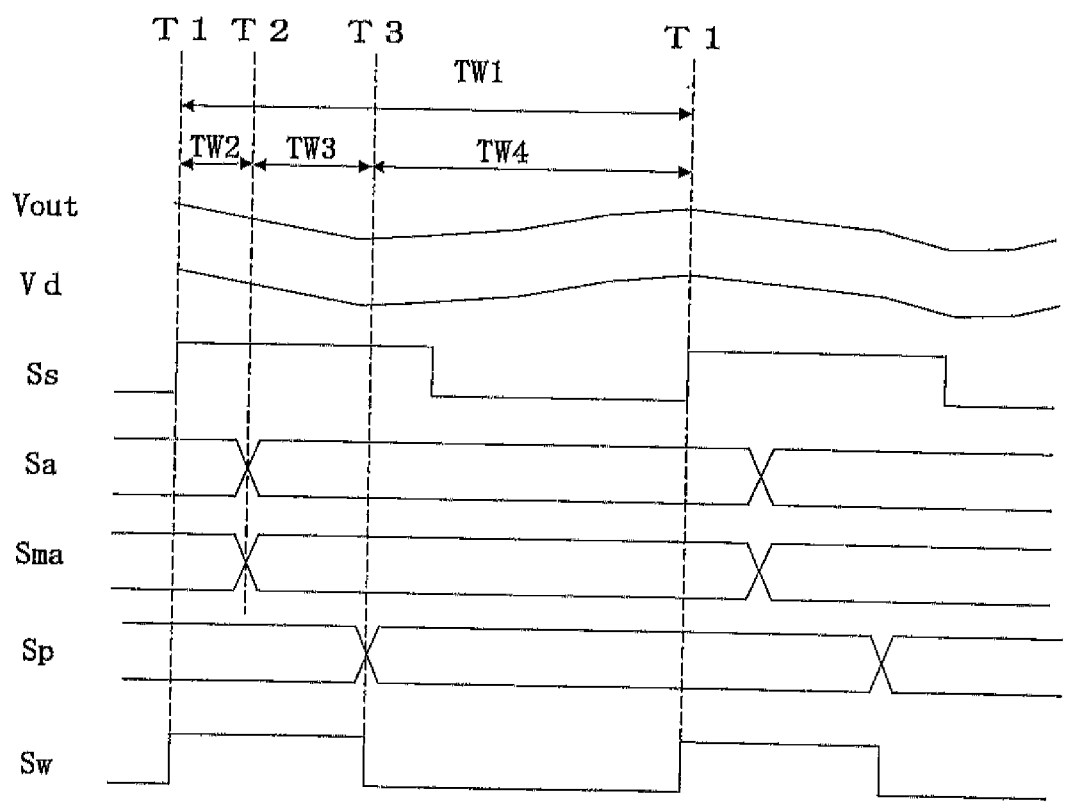
FIG. 4 is a timing chart for describing operation of the power supply control device according to the first exemplary embodiment of the present disclosure.

FIG. 4 is a timing chart for describing operation of the power supply control device according to the first exemplary embodiment of the present disclosure. A description is given of operation of FIG. 1 and FIG. 2, using the timing chart of FIG. 4.

At timing T1, the A/D converter 13 samples the monitored voltage value Vd obtained by monitoring the output voltage Vout, and starts A/D conversion. The A/D converter 13 outputs the AD conversion synchronous signal Ss at a high level, at the same time as starting the A/D conversion.

By the output circuit 34 outputting the PWM output signal Sw at a high level in synchronization with starting of high level output to the AD conversion synchronous signal Ss, the switching circuit 22 outputs at a low level, and the voltage of the output voltage Vout is lowered.

Timing T2 is timing after the elapse, from timing T1, of an A/D conversion time-period TW2, which is the time required for A/D conversion. At timing T2, the A/D converter 13 outputs the AD converter output signal Sa, and the CPU 11 stores the sampling data Sma in the storage unit 12.

Timing T3 is timing after the elapse, from timing T2, of a CPU computation time-period TW3, which is the time required for a computation that determines the ON duty ratio of the PWM output signal Sw in the CPU 11. At timing T3, the CPU 11 outputs the CPU output signal Sp that determines the ON duty ratio of the PWM output signal Sw, to the pulse oscillator 14. The pulse oscillator 14 outputs the PWM output signal Sw at a low level, according to the ON duty ratio determined by the CPU output signal Sp. In this way, the switching circuit 22 outputs at a high level, and the transformer 21 and the rectification smoothing circuit raise the output voltage Vout.

In FIG. 4, at timing T3 the PWM output signal Sw is outputted at a low level, but a determination is made of timing of outputting the PWM output signal Sp at a low level within an ON duty adjustment time-period TW4, according to the ON duty ratio determined by the CPU output signal Sp.

At subsequent timing T1 after the elapse of a switching period TW1 after timing T1, the A/D converter 13 samples the monitored voltage value Vd again, and starts A/D conversion. The A/D converter 13 causes the AD conversion synchronous signal Ss to rise at the same time as starting the A/D conversion.

Thereafter, control is repeated in order that the output voltage Vout approaches the output voltage target setting signal St, by repeating an operation of the switching period TW1.

Next, a description is given concerning each part, citing a specific numerical example. In a case where, for example, the switching circuit 22 is ON when the PWM output signal Sw has low level output, and is OFF when the PWM output signal Sw has high level output, when the switching period TW1 is 5 us, the A/D conversion time-period TW2 is 0.1 us, the CPU computation time-period TW3 is 1.5 us, a target value of the output voltage Vout is 1.2 V, and an output voltage margin is 0.1 V, a setting value of the switching frequency setting signal Sf is 5 us, and a setting value of the required computation time setting signal S is 1.6 us.

From the following Expression 1, the maximum low level output time-period in which the PWM output signal Sw can be outputted (described below as a maximum ON duty ratio) is 68%.

$$100\% - (1.6\ us/5\ ux100\%) = 68\% \quad \text{Expression 1}$$

If the output voltage target setting signal St is set to 1.2 V, and the output voltage margin setting signal Sm is set to 0.1 V, with the maximum ON duty ratio as 68%, 1.3 V is preferably outputted.

From Expression 2, with the ON duty ratio of 100%, the computation outputs about 1.91 V.

$$1.3\ V \times 100\%/68\% = 1.91\ V \quad \text{Expression 2}$$

Consequently, a PWM output signal Sw which preserves linearity is preferably outputted, so that the output voltage maximum value setting signal Smax is set to 1.91 V, the output voltage minimum value setting signal Smin is set to 0 V, with an ON duty ratio of 0%, 0 V is outputted, and with an ON duty ratio of 100%, 1.91 V is outputted.

Furthermore, regarding an AD conversion code with respect to the maximum input voltage of the A/D converter 13, the AD conversion input range setting signal Si is set to "1024", and an output code of the A/D converter 13 with respect to the 1.91 V, which was set to the output voltage maximum value setting signal Smax, is set to "651", which is the AD conversion code setting signal Sc of 1.91 V input for a case of using the A/D converter 13 with an input voltage range of 0 V to 3 V, and 10 bit resolution.

In a case where the CPU output signal Sp outputs "219" (equivalent to an AD conversion code for input 1.2 V of the A/D converter 13) by a computation in the CPU 11, it is possible to obtain the ON duty ratio outputted by the PWM output signal Sw, from Expression 3.

$$219 \div 651 \times 100\% = 62.826\% \quad \text{Expression 3}$$

Furthermore, in a case where the CPU computation time-period TW3 is set to 2.0 us, the maximum ON duty ratio that can be outputted is 58%, according to Expression 4.

$$100\% - (2.1\ us/5\ ux100\%) = 58\% \quad \text{Expression 4}$$

From Expression 4, if the output voltage target setting signal St is set to 1.2 V, and the output voltage margin setting signal Sm is set to 0.1 V, with the maximum ON duty ratio as 58%, 1.3 V is preferably outputted.

That is, from Expression 5, with an ON duty ratio of 100%, about 2.24 V is outputted.

$$1.3V \times 100\%/58\% = 2.24\ V \quad \text{Expression 5}$$

Furthermore, an output code of the A/D converter 13 with respect to the 2.24 V, which was set to the output voltage maximum value setting signal Smax, is set to "764", which is the AD conversion code setting signal Sc for a case of using the A/D converter 13 with an input voltage range of 0 V to 3 V, and 10 bit resolution. In a case where the CPU output signal Sp outputs "219" (equivalent to an AD conversion code for input 1.2 V of the A/D converter 13) by a computation executed by the CPU 11, it is possible to obtain the ON duty ratio outputted by the PWM output signal Sw, from Expression 6.

$$219 \div 764 \times 100\% = 53.534\% \quad \text{Expression 6}$$

Above, according to the power supply control device of the present exemplary embodiment, the A/D conversion time-period and the CPU computation time-period are allotted to a high level output time-period of the PWM output signal Sw (a time-period in which the switching circuit outputs at a low level), and, within an output voltage margin range for a target value of the output voltage Vout, a pulse width modulation signal of an arbitrary ON duty ratio is outputted. At this time, by accommodating sampling timing of the A/D converter 13 and timing of the PWM output signal Sw at the same time, it is possible to get rid of control delay time, and to start output of the pulse width modulation signal at the same time as sampling by the A/D converter 13. Therefore, control accuracy of suppression of variation of the output voltage is improved.

Second Exemplary Embodiment

Figure 5:
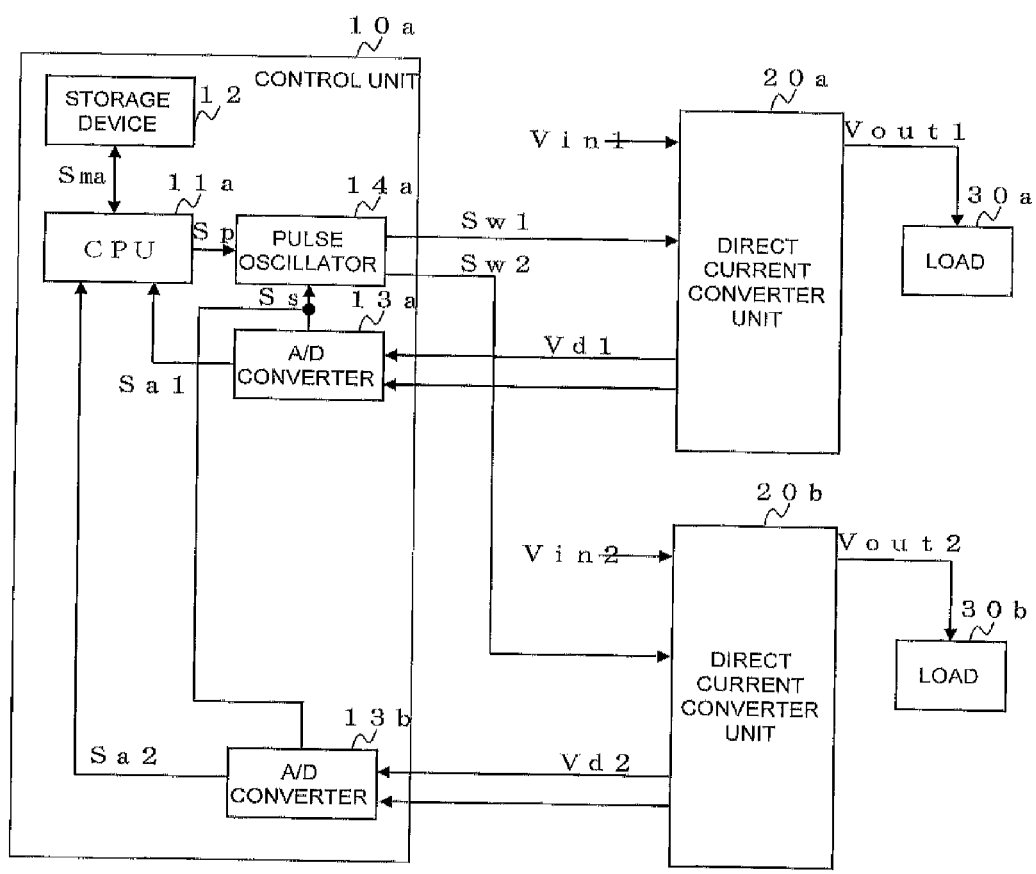
FIG. 5 is a drawing showing a configuration of a power supply control device according to a second exemplary embodiment of the present disclosure.

FIG. 5 is a drawing showing a configuration of a power supply control device according to a second exemplary embodiment of the present disclosure. Component parts that are identical to FIG. 1 are indicated by the same reference numerals, and descriptions thereof are omitted. The power supply control device of the second exemplary embodiment is provided with a control unit 10a and 2 direct current converter units 20a and 20b. The direct current converter unit 20a is controlled by the control unit 10a, and a voltage Vout1 obtained by stepping up or stepping down a power supply voltage Vin1 from outside is supplied to a load 30a. Furthermore, the direct current converter unit 20b is controlled by the control unit 10a, and a voltage Vout2 obtained by stepping up or stepping down a power supply voltage Vin2 from outside is supplied to a load 30b. The direct current converter units 20a and 20b are each configured in the same way as the direct current converter unit 20 of FIG. 1.

The control unit 10a is provided with a CPU 11a, a storage device 12, A/D converters 13a and 13b, and a pulse oscillator 14a. The A/D converter 13a, with a monitored voltage value Vd1 from the direct current converter 20a as input, performs sampling and A/D conversion, and outputs to the CPU 11a as an AD converter output signal Sa1. The A/D converter 13b, with a monitored voltage value Vd2 from the direct current converter 20b as input, performs sampling and A/D conversion, and outputs to the CPU 11a as an AD converter output signal Sa2.

The CPU 11a receives, as input, AD converter output signals Sa1 and Sa2, to be stored in the storage device 12 as sampling data Sma, and in addition computes the duty of a pulse width modulation signal for each of the direct current converter units 20a and 20b, and outputs a computation result to the pulse oscillator 14a as a CPU output signal Sp. The pulse oscillator 14a generates a pulse width modulation signal Sw1 controlling the position of a rising edge by rising of an AD conversion synchronous signal Ss, and controlling the position of a falling edge by the CPU output signal Sp based on the monitored voltage value Vd1, and outputs to the direct current converter 20a. Furthermore, a pulse width modulation signal Sw2 controlling the position of a rising edge by falling of the AD conversion synchronous signal Ss, and controlling the position of a falling edge by the CPU output signal Sp based on the monitored voltage value Vd2, is generated and outputted to the direct current converter 20b.

Figure 6:
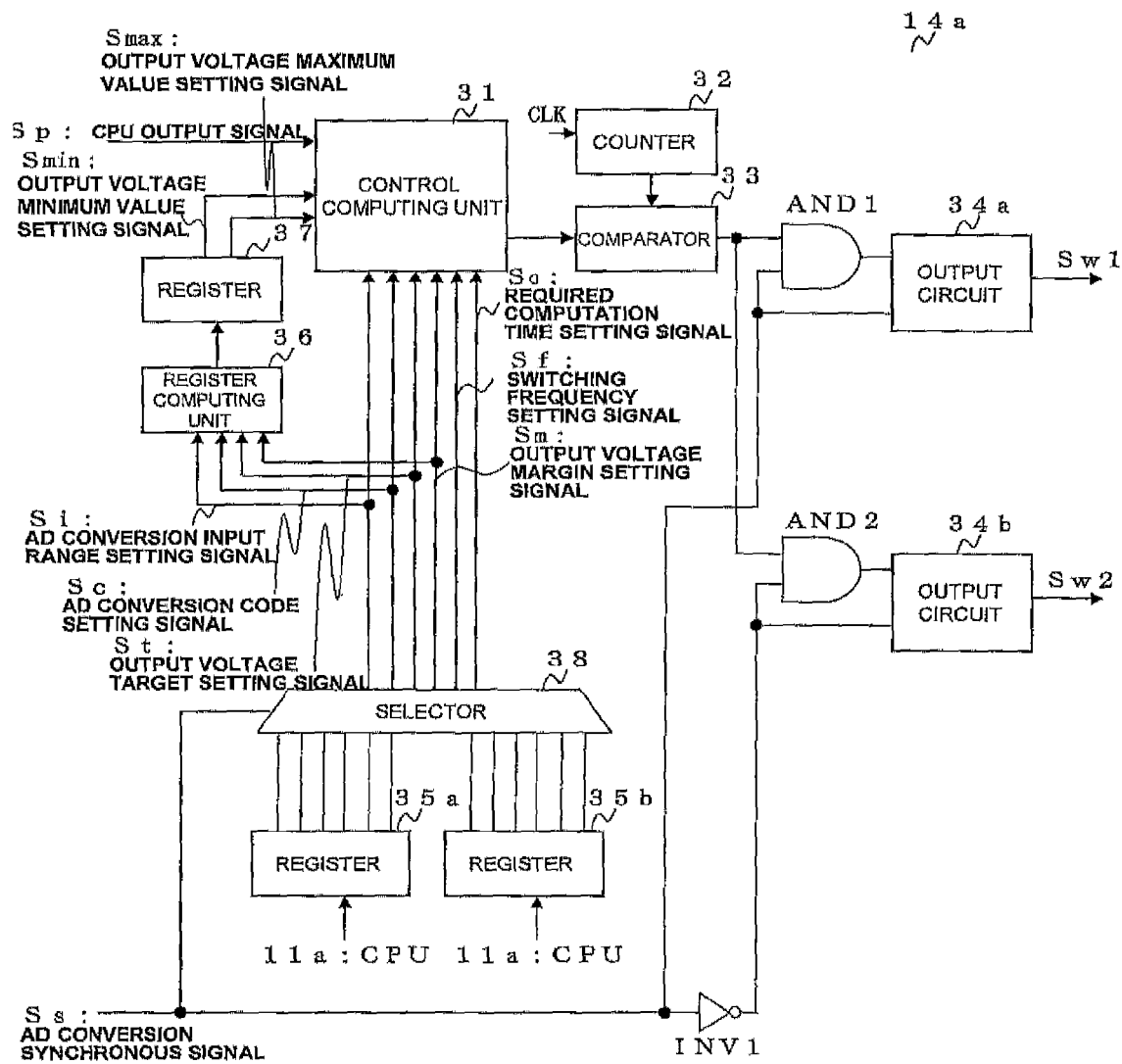
FIG. 6 is a drawing showing a configuration of a pulse oscillator according to the second exemplary embodiment of the present disclosure.

FIG. 6 is a drawing showing a configuration of the pulse oscillator according to the second exemplary embodiment of the present disclosure. Component parts that are identical to FIG. 2 are indicated by the same reference numerals, and descriptions thereof are omitted. The pulse oscillator 14a is provided with a selector 38 and registers 35a and 35b, instead of a register 35. The selector 38 selects the register 35a in a case where the AD conversion synchronous signal Ss has a high level, selects the register 35b in a case where the AD conversion synchronous signal Ss has a low level, and outputs the respective selected signals to a control computing unit 31 and a register computing unit 36.

Furthermore, the pulse oscillator 14a is provided with an inverter circuit INV1, AND circuits AND1 and AND2, and output circuits 34a and 34b. The output circuits 34a and 34b each operate in the same way as the output circuit 34 of FIG. 2. The AND circuit AND1 outputs a comparison result output of a comparator 33 to the output circuit 34a in a case where the AD conversion synchronous signal Ss is at a high level. The AND circuit AND2 outputs a comparison result output of the comparator 33 to the output circuit 34b in a case where the AD conversion synchronous signal Ss is at a low level (output of the inverter circuit INV1 is at a high level).

Figure 7:
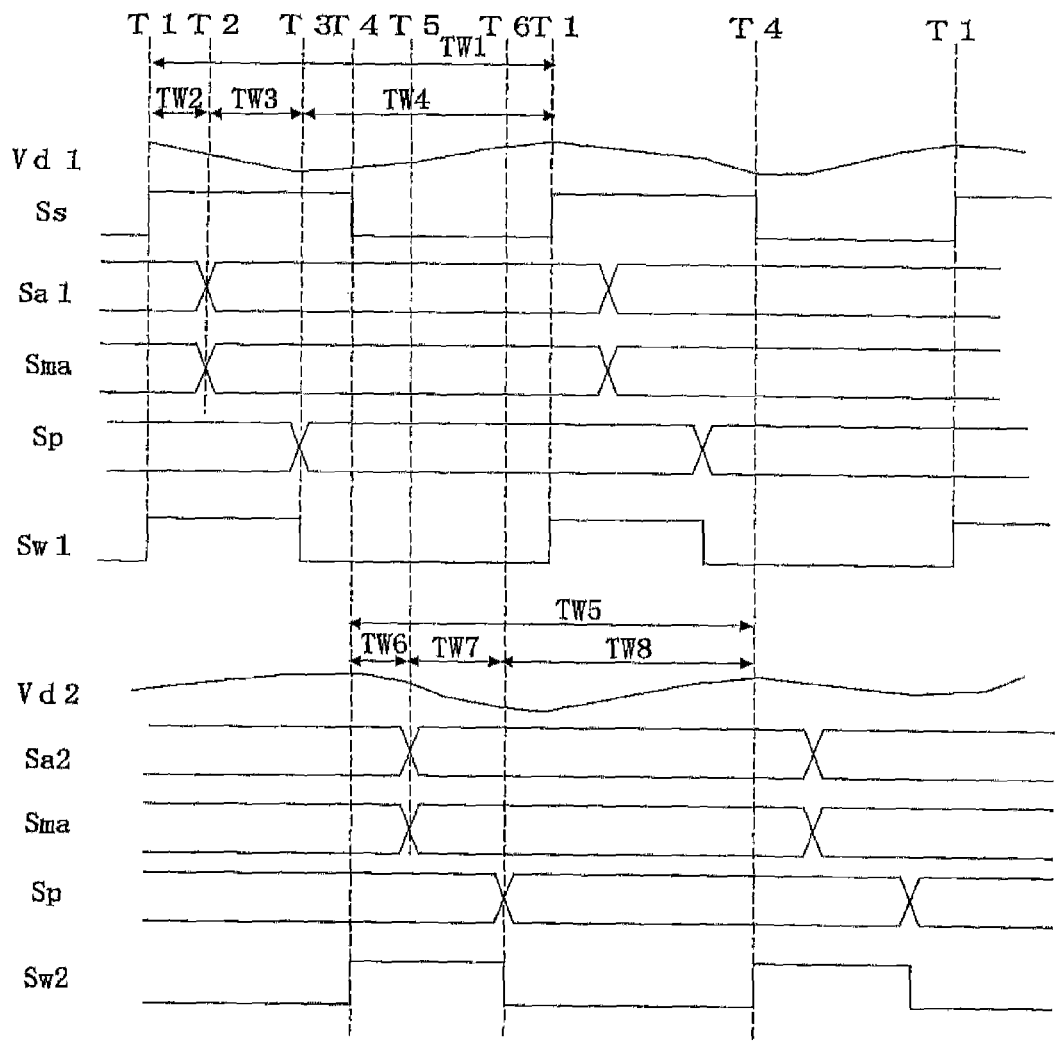
FIG. 7 is a timing chart for describing operation of the power supply control device according to the second exemplary embodiment of the present disclosure.

FIG. 7 is a timing chart for describing operation of the power supply control unit according to the second exemplary embodiment of the present disclosure. In FIG. 7, transitions of respective signals (Ss, Sa1, Sma, Sp, and Sw1) during TW1 are respectively identical to the respective signals (Ss, Sa, Sma, Sp, and Sw) of FIG. 4, and descriptions thereof are omitted. Furthermore, transitions of respective signals (Sa2, Sma, Sp, and Sw2) with regard to TW5 between timing T4 at which the AD conversion synchronous signal Ss falls and a subsequent timing T4, respectively correspond to transitions of the respective signals (Sa1, Sma, Sp, and Sw1) during TW1, and change in a similar way. That is, A/D conversion of the A/D converter 13a is started with rising of the AD conversion synchronous signal Ss at timing T1 as a reference, and at the same time the pulse oscillator 14a outputs the PWM output signal Sw1 at a high level. Furthermore, the A/D conversion of the A/D converter 13b is started with falling of the AD conversion synchronous signal Ss at timing T4 as a reference, and at the same time the pulse oscillator 14a outputs the PWM output signal Sw2 at a high level. The timing of falling of the PWM output signals Sw1 and Sw2 is respectively determined in the same way as timing of falling of the PWM output signal Sw described in the first exemplary embodiment.

In the power supply control device of the second exemplary embodiment, control is possible to have no time difference from starting control computation with regard to the monitored voltage value Vd1 until the PWM output signal Sw1 based on an actual control computation result, by the AD conversion synchronous signal Ss indicating sampling timing of the A/D converter 13a. Furthermore, control is possible to have no time difference from starting control computation with regard to the monitored voltage value Vd2 until the PWM output signal Sw2 based on an actual control computation result. In this case, an operation is performed so that, by making A/D conversion of 2 systems correspond at respective levels of the AD conversion synchronous signal Ss, overlapping of timing of A/D conversion of the 2 systems is prevented, and increase in consumed peak current of the control unit 10a is suppressed.

According to the above type of power supply control device the following types of effect are realized.

A first effect is that the power consumption of a load is reduced. A reason for this is that, by enabling control so as to have no time difference from starting control computation with regard to the sampled monitored voltage value until PWM output based on an actual control computation result, it is possible to lower average operational voltage of a load device by improving control accuracy of output voltage variation suppression in a steady state of the power supply control device.

A second effect is that a rising characteristic for the power supply control device is improved. A reason for this is that, by enabling control so as to have no time difference from starting control computation with regard to the sampled monitored voltage value until the PWM output based on the actual control computation result, an overshoot occurrence when the power supply output of the power supply control device is rising is suppressed.

A third effect is that, in a case of performing control of the power supply in a plurality of systems, it is possible to reduce the largest consumption current of the control unit by preventing simultaneous operation of each power supply. A reason for this is that, with regard to the power supplies of the plurality of systems, with 1 A/D conversion synchronous signal, it is possible to perform exclusive control that is not performed simultaneously, by shifting sampling timing of the A/D converters.

Each disclosure of the above mentioned patent document is incorporated by reference into the present document. Modifications and adjustments of exemplary embodiments and examples are possible within bounds of the entire disclosure (including the scope of the claims) of the present disclosure, and also based on fundamental technological concepts thereof. Furthermore, a wide variety of combinations and selections of various disclosed elements are possible within the scope of the claims of the present disclosure. That is, the present disclosure clearly includes every type of transformation and modification that a person skilled in the art can realize according to technological concepts and the entire disclosure including the scope of the claims.

What is claimed is:

1. A control device, comprising:
a first terminal receiving a monitored output voltage;
a second terminal transmitting a pulse width modulation (PWM) signal;
a converting unit generating an A/D conversion synchronous signal;
an A/D converter sampling said monitored output voltage in accordance with said A/D conversion synchronous signal; and
a pulse oscillator controlling a position of a first edge on the PWM signal in accordance with said A/D conversion synchronous signal, and controlling a position of a second edge based on said monitored voltage.

2. The control device according to claim 1, wherein said pulse oscillator comprises:
a control computing unit computing a duty ratio of said PWM signal based on said monitored output voltage; and
an output circuit controlling a position of a first edge on the PWM signal in accordance with said A/D conversion synchronous signal becoming active, and controlling a position of a second edge on the PWM signal based on said duty ratio.

3. The control device according to clam 1, further comprising a direct current conversion unit stepping up or stepping down an input voltage based on the PWM signal to output an output voltage, and including a voltage detection circuit monitoring said output voltage to output said monitored output voltage.

4. The control device according to claim 1, wherein said pulse oscillator comprises:
a counter counting a count value;

a control computing unit computing a control computation result based on said monitored output voltage;

a comparator detecting that said count value reaches said control computation result, and outputting a comparison result; and an output circuit controlling a position of a first edge on the PWM signal in accordance with said A/D conversion synchronous signal becoming active, and controlling a position of a second edge on the PWM signal based on said comparison result.

5. The control device according to claim 4, wherein said counter is cleared in accordance with A/D conversion synchronous signal.

* * * * *